C. C. ROBERTS.
GEAR CUTTING MACHINE.
APPLICATION FILED NOV. 30, 1907.

953,059.

Patented Mar. 29, 1910.
4 SHEETS—SHEET 2.

Witnesses.
Robert Ewatt
C. D. Kesler

Inventor:
Charles C. Roberts.
By James L. Norris.
Atty.

UNITED STATES PATENT OFFICE.

CHARLES C. ROBERTS, OF ANSONIA, CONNECTICUT.

GEAR-CUTTING MACHINE.

953,059.　　　　Specification of Letters Patent.　　Patented Mar. 29, 1910.

Application filed November 30, 1907. Serial No. 404,514.

*To all whom it may concern:*

Be it known that I, CHARLES C. ROBERTS, a citizen of the United States, residing at Ansonia, in the county of New Haven and State of Connecticut, have invented new and useful Improvements in Gear-Cutting Machines, of which the following is a specification.

This invention relates to gear cutting machines, the object of the invention being to provide an effective apparatus of this character having means for accurately and quickly forming gears of various types.

In the drawings accompanying and forming a part of this specification I show in detail one advantageous form of embodiment of the invention which, to enable those skilled in the art to practice the same, will be set forth at length in the following description, while the novelty of the invention will be included in the claims succeeding said description.

Referring to said drawings: Fig. 4 is a detail view in side elevation of reversing mechanism. Fig. 5 is a top plan view, Fig. 12 is a detail view in section of a portion of the clutch-shifting device hereinafter fully described, and Fig. 13 is a perspective view of the same.

Like characters refer to like parts throughout the several figures of the drawings.

Figure 1:
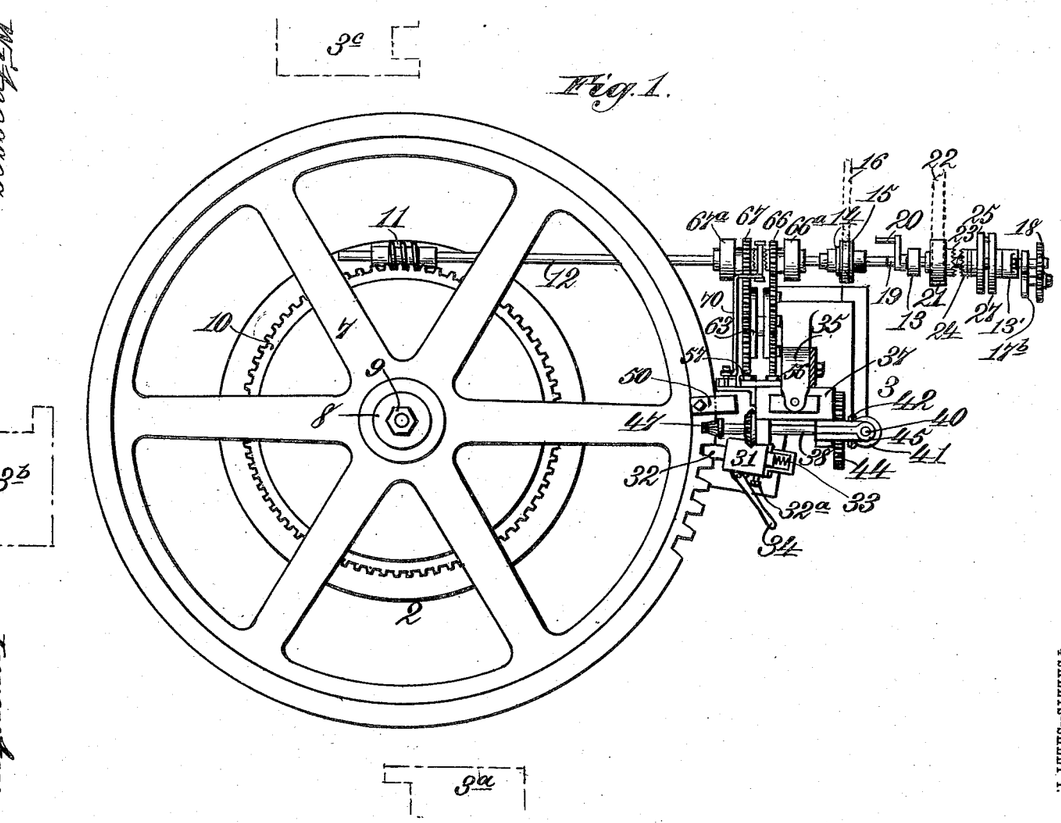
Figure 1 is a top plan view of a gear cutting machine involving my invention.
Figure 2:
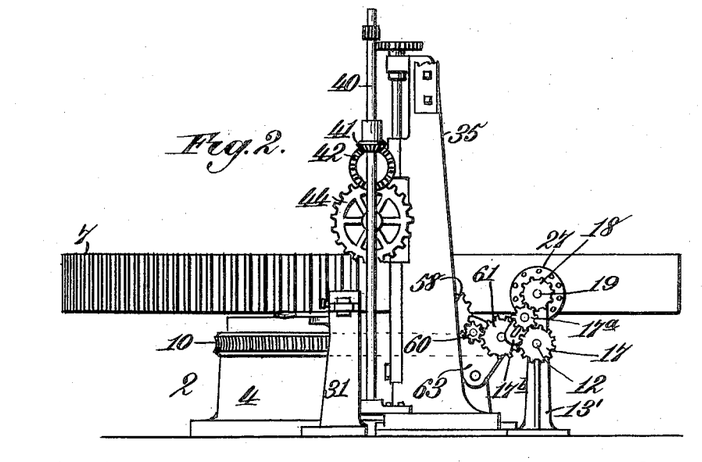
Fig. 2 is a side elevation of said machine.
Figure 3:
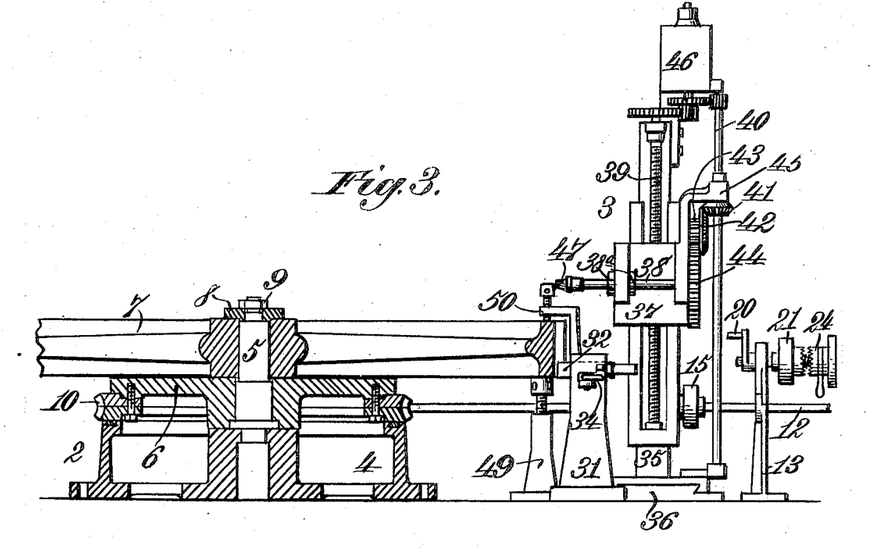
Fig. 3 is a sectional front elevation of the same.

Referring particularly to Figs. 1, 2, and 3 of the drawings, the machine therein represented involves in its make-up work or blank carrying means such as that denoted in a general way by 2, and milling or cutting mechanism such as that denoted in a general way by 3, both of which will be hereinafter fully described. If desired, the milling mechanism 3 may be portable so as to adapt the machine to the formation of gears which vary widely in diameter, or the milling mechanism may be arranged around the blank in multiple, the parts denoted by $3^a$, $3^b$, and $3^c$, respectively, in Fig. 1 representing conventionally or diagrammatically milling mechanisms constructed and operated like said milling mechanism 3. All four of the milling mechanisms may be portable or stationary, as deemed desirable; all of them may be operative at the same time so as to increase the output of the work, or one or more of them may operate. When I describe therefore the milling mechanism 3 this will apply to the milling mechanisms $3^a$, $3^b$, and $3^c$. It is, of course, evident that only one of these mechanisms need be employed in the machine, a plurality being useful or beneficial where rapidity in results is desired.

The work supporting means may, of course, be of any desirable character; that shown in the drawings involves in its make-up a standard as 4 in which is stepped or mounted substantially centrally a work-centering spindle or arbor as 5. The spindle is shown as extended centrally through the turn table 6 upon which the work 7 is sustained, the work or blank being illustrated as clamped or rotatively connected with the turn-table 6 by means of a plate as 8 surrounding the upper reduced end of the spindle 5 and held against the blank or work by a nut as 9. The turn-table 6 is sustained by the standard 4 and is given a step-by-step rotation, the steps or degrees of movement of the table being automatically controlled by index means when the machine is being operated by power or hand for cutting either spur gears or gears having teeth of irregular shape. Any desirable means may be utilized for rotating said table; for this purpose I have shown worm gearing consisting in the present case of the worm gear 10 and worm 11. The worm gear 10 is shown as sustained by the standard or bearing 4 and is fastened in some suitable way to the under side of the turn-table 6; screws, for example, may be utilized for connecting these two parts.

The worm 11 is represented as splined to the shaft 12 supported at its outer end by uprights or standards as 13 and 13' hereinafter more particularly described. There is shown as fastened to said shaft 12 a friction member 14 coöperating with a friction member as 15 loose on said shaft, and the latter consists of a suitable driven member such, for example, as a pulley which, when the machine is being operated by power to cut a straight-tooth or spur gear may be operated by a belt such as 16 shown by dotted lines in Fig. 1. It will be apparent, therefore, that, when the belt 16 is operated, the gear blank 7 will be caused to turn through the intervention of the intermediate parts. By virtue of the friction gearing it is apparent that, when the gear blank is stopped by the index mechanism, no injury can result for the pulley 15 can continue to turn without doing any harm after the blank has been stopped for the cutting of a tooth space therein.

The shaft 12 is represented as having fastened thereto outside of and in adjacence to the standard 13' a gear 17 meshing with the pinion 17$^a$ meshing in turn with the gear 18 illustrated as fastened to the extreme outer end of the index shaft 19 sustained at the upper end of said standards 13 and 13' for rotary movement. The intermediate gear 17$^a$ is removably supported by a bracket as 17$^b$ sustained loosely by the shaft 19 for swinging movement and held in an adjusted position to conform to the particular diameter of the gear carried thereby, by a set-screw as 17$^c$ tapped into the standard 13'. At its inner end the upper shaft 19 is represented as provided with a manually operative device such as the hand-crank 20 whereby said shaft may be turned by hand. The shaft 19 is shown as loosely carrying a driven wheel 21 which may consist of a pulley and which may be connected with a suitable motor by means of a belt as 22 (see dotted lines in Fig. 1). The hub of said pulley 21 is represented as provided with an outwardly extending sleeve 23 constituting in the present case one member of a clutch, the outer end of said sleeve 23 being toothed for this purpose and coöperating with a clutch member as 24 formed centrally of and extending inwardly from a disk or wheel as 25 suitably fastened to the shaft 19 for rotation therewith. This disk or wheel 25 is furnished with a removable pin as 26 coöperative with a fixed index plate as 27 connected in the present case with the standard 13'. This index plate 27 is provided, as is common in this class of device, with one or more circular rows or series of perforations or holes, those of a row or annular series which are not in use during indexing being plugged by pins.

Figures 10, 11:
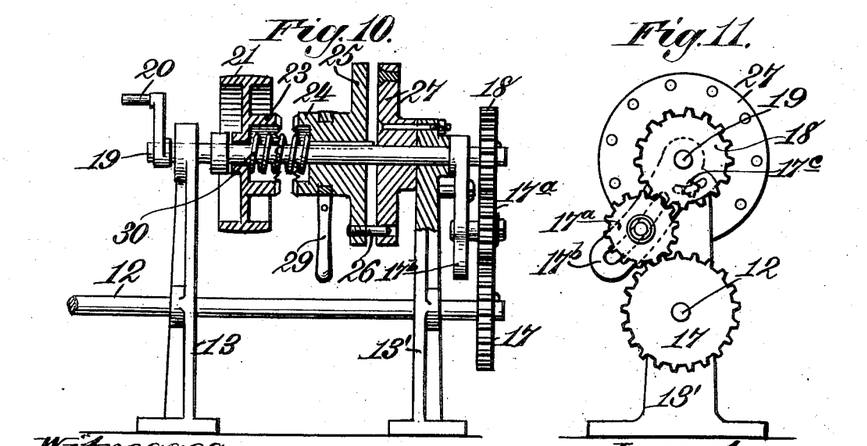
Fig. 10 is a sectional view of the indexing mechanism.
Fig. 11 is a detail outside face view of a portion of said indexing mechanism.

The clutch member 24 is shown as shiftable by a hand-lever as 29 and is held out of contact with the companion clutch member 23 by means of a spring 30 coiled around the shaft 19 and acting against the pulley 21 and disk or wheel 25 respectively. It will be assumed that the pin 26 is in one of the holes in the index or plate 27, as shown in Fig. 10, and that the pulley 21 is being rotated. At this time the clutch member 24 is out of engagement with the companion clutch member 23. To turn the shaft 12 the lever 29 is swung to the left in said Fig. 10 so as to put the clutch member 24 into engagement with the clutch member 23 and withdraw the pin 26 from the hole it occupies. When this result occurs the disk 25 is caused to turn, as is also the shaft 19, the turning motion continuing until the pin 26 comes opposite a second hole in the index plate 27 when the spring 30 becomes effective for moving the clutch member 24 out of engagement with the clutch member 23 and thrusting said pin 26 in said second hole, thereby stopping the turning of the shaft 19. It therefore follows that by this operation the shaft 12 can be turned or rotated step by step for correspondingly moving the gear blank 7. The degree of movement of each step will be regulated by the ratio of the change gears 17, 17$^a$, and 18 and the character of the indexing means. In the present case, when the blank is at rest, I cut spaces depthwise therethrough, the stock between the spaces forming the teeth of the gear. It will be clear that by turning the shaft 19 through the hand-crank 20, the teeth can be formed in the blank without the use of power; that is to say, the gear can be turned step by step with the aid of the index mechanism by hand. The index mechanism shown in Fig. 10 may be exclusively utilized in cutting a spur gear, but I prefer to employ other indexing means now to be described, in forming such a gear. The gears 17, 17$^a$, and 18 are at the extreme outer end of the apparatus, by virtue of which they can be readily dismounted.

I have shown as mounted in proximity to the periphery of the gear blank 7 a standard or upright as 31 the head of which is provided with a slidable stop as 32 which constitutes really an index device, said stop or index device being movable toward its operative position by a spring as 33 (see Fig. 1) acting against the tail of the same and also against a fixed part of the standard or upright 31. The stop or index device 32 is shown as occupying its advanced position in Fig. 1 of the drawings, at which time its working or extreme inner end fits in a space between two cut teeth, this relation being, of course, maintained by the spring 33. The stop or index device is retracted in any suitable manner to permit the turning of the gear blank 7, for example, by means of a hand-lever as 34 acting against the same and fulcrumed to the standard or upright 31. The working portion of said stop is preferably of the shape of a tooth or tooth space.

In cutting a spur gear by power I usually use the index mechanism shown fully in Fig. 10 for effecting the formation of several teeth and, after this, rely upon the index device or stop 32 which, as will be understood, engages the peripheral portion of the blank and which is quite accurate and precise in its function. During the use of the indexing mechanism shown in Fig. 10 the stop or index device 32 is held retracted by a set-screw 32ª or by the operation of the hand-lever 34. It will be assumed that several teeth have been cut in the blank by the aid of the index mechanism shown in Fig. 10. After this the stop or index device 32 is used. It will be assumed that the index means shown in Fig. 10 is not in operation and that the blank 7 is being cut. During the action of a cutting tool the working or inner end of the stop or index device 32 will fit in a tooth space. To form an ensuing tooth said stop or index device 32 will be retracted so that the blank 7 can be turned. As soon as a previously cut space in the blank comes opposite the stop or index device 32 the latter is instantly shot forward by the power of the spring 33 to carry its inner end into a second tooth space. During the time the index device or stop 32 is being used the shaft 12 is being driven by the belt 16 in the manner previously described.

The milling mechanism 3 involves in its make-up a standard as 35 which in the present case is slidably supported upon the bed plate or foundation member 36, the parts being so related that the standard is capable of movement tangentially with respect to the blank 7. The reason for this will be hereinafter made obvious. The standard 35 is shown as supporting for vertical sliding movement a carriage or head as 37 provided with suitable bearings for the mill spindle 38. Said standard 35 is also represented as supporting a vertically disposed rotative feed screw 39, the carriage or head 37 having as is common in this class of machinery a feed nut for coöperation with said feed screw 39. It will be clear therefore that, as the feed screw 39 is turned, the carriage or head 37 is moved down or up in accordance with the direction of motion of said feed screw. In addition to the feed screw 39 the standard also supports a vertically disposed rotative shaft as 40 to which is represented as splined a beveled gear 41 meshing with the beveled gear 42, the shaft of which is provided with a pinion as 43 meshing with the gear 44 fastened to the outer end of the spindle 38. It will therefore be evident that, when the shaft 40 is turned, the spindle 38, through intermediate parts, will also be turned and this result will follow during the vertical movement of the carriage or head 37 owing to the splined relation between the gear 41 and the shaft 40, the gear 41 moving down and up with said head or carriage 37, the latter being shown as equipped with a lateral bracket as 45 to which said gear 41 is rotatively connected or swiveled. The feed screw 39 and shaft 40 may be rotated in any desirable manner, for example, by an electric motor as 46 mounted on the upper end or head of the standard 35 and the shaft of which is geared to said feed screw 39 and shaft 40 respectively. When, therefore, the motor is in operation, the feed screw 39 and shaft 40 are simultaneously operated so as to effect the vertical feed of the carriage and the simultaneous turning of the spindle 38.

Figure 8:
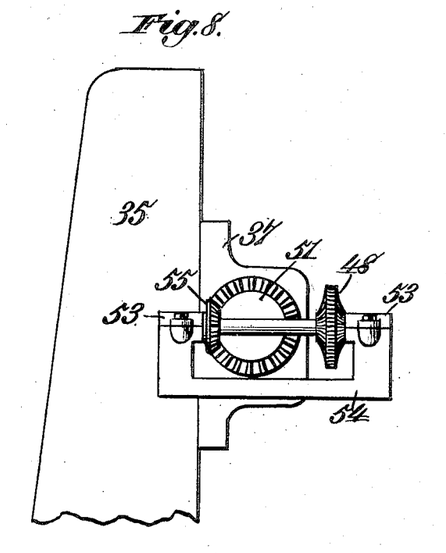
Fig. 8 is a side elevation of a finishing mill and driving means therefor.
Figure 9:
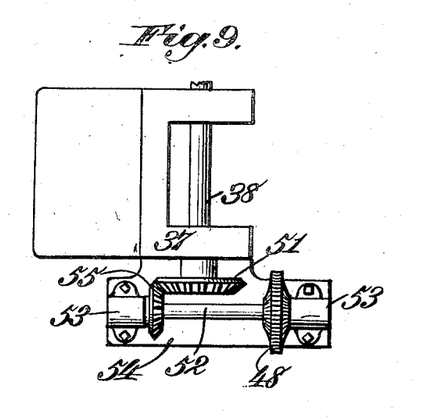
Fig. 9 is a top plan view of the same.

In operating on certain kinds of metal I may use a single mill as 47, and, in operating upon other kinds of metal, I may use said mill 47 as a secondary or finishing mill, the mill which makes the primary or initial cut being denoted by 48 and consisting of a wheel shown clearly in Figs. 8 and 9 and hereinafter described as to its mounting and mode of operation. The mill 47, which is removably fastened to the spindle 38, is substantially frusto-conical in shape, although its periphery is upon a slight ogee curve; in other words, the mill 47 corresponds to the shape of a finished tooth or approximately so, by virtue of which with certain kinds of metal, said mill, when it has finished its operations upon a blank, will have made or formed a commercial gear.

It will be assumed that the mill 47 is above the gear blank 7 and that the motor 46 is at rest, the mill being shown in such position in Fig. 3. At this time the preliminary index mechanism will be in the relation shown in Fig. 10. The motor 46 is then put in action so as to feed the carriage 37 downward and to also rotate the mill 47. On the downward motion of the carriage or head 37 the mill 47 is caused to cut through the peripheral portion of the blank 7 to form a tooth space. The preliminary index mechanism shown in Fig. 10 is then operated to cause the turning of the blank the requisite step, after which the carriage or head 37 is elevated or returned to its original position and, during this motion, the mill 47 can cut through the stock or blank to form a second tooth space. When a desired number of teeth spaces have been formed in the blank the stop or index device 32 can be utilized as hereinbefore described. The reversing motion of the carriage or head, of course, may be accomplished by reversing the motor 46. I may cut tooth spaces during the downward or upward motion of the carriage or head 37 or may cut said spaces during both the downward and upward movements of said carriage or head. The blank 7 may during the cutting operation be prevented from down-thrust by one or more jacks as 49, while upward thrust of the blank may be prevented by the heads of standards as 50 which heads overlie the upper portion of the blank. The operations described in the formation of the tooth spaces are continued until the blank is fully finished, at which time, if the blank be of certain metal, the gear is finished ready for use. With very hard metals, to secure a prime or desirable finish, the mill or tool 47 is employed after the mill or tool 48 has roughed out teeth in the blank.

In practice the jack 49 and standard 50, as well as the standard 13, bed member 36, and standard 4 will be, when in action, held fixedly in position, for example, by being fastened to the bed plate of the apparatus. To accomplish this result the following procedure is adopted. The tool 47, should it be mounted on its spindle 38, is removed, after which a beveled gear as 51 is fastened to said spindle, occupying the place of the said tool 47. The removably mounted shaft 52 will then be rotatively mounted in boxes as 53 carried on the lateral extension or bracket 54 of the carriage 37, as fully represented in Figs. 8 and 9. The cap pieces of said boxes 53 are detachably mounted so that said shaft 52 can be easily put in place or removed. Said shaft 52 is represented as carrying at one end a beveled gear as 55 to mesh with the beveled gear 51, while the circular mill 48 is carried at the other end of said shaft. It therefore follows that, when the spindle 38 is in action and when the shaft 52 is in place, the mill 48 will be rotated. The spindle or shaft 38 is endwise movable so that, when the shaft 52 and the parts carried thereby are dismounted, said spindle can be drawn forward so that the mill 47 can be in proper position to act on the work. After the shaft 52 and necessarily the mill 48 are mounted as described, the standard 35 as a whole is moved to bring the primary or circular mill 48 into correct position to form the initial spaces in the blank, and during this period of operation the stop or index device 32 is employed. When both mills are used, as it is believed will be understood, the first cut is made by the mill 48, after which the shaft 52 and beveled gear 51 are dismounted and the spindle 38 drawn forward so that the mill 47 can be applied to said spindle 38 and be in correct position to finish out the spaces cut in the blank by the mill 48, the standard 35 being moved forward so as to bring the mill 47 in accurate position or to center the same with respect to the blank. The spindle 38 may be held in its forward position in any desirable manner, for example, by means of thrust collars as 38ª adjustably fastened thereto. The standard 35, and the bed 36 which sustains said standard are movable radially of the blank 7 so as to adapt the apparatus to cut gears of different diameters and, during the radial adjustment of said standard and bed plate, the shaft 12 is moved endwise therewith. To always maintain the shaft 12 in operative relation with the worm 11 the latter is splined to said shaft, as clearly indicated in Fig. 1.

The foregoing is a full and complete description of that form of embodiment of the invention adapted especially for cutting spur gears and it will be clear that in cutting a gear of such type only the mill 47 need be used, although in some cases I prefer to employ both the mills 47 and 48.

The machine or apparatus is organized for cutting chevron toothed or herring-bone gears and, in forming a gear of this type, the index device or stop 32 may be and preferably is employed during a portion of the operation. The belt 16, however, is not in action, the shaft 12 being preferably driven from the vertically movable carriage or head 37. In forming a chevron tooth gear I employ the mill 47 and initially make around the periphery of the blank with the said mill several shallow cuts or notches into which the index device 32 is adapted to be thrust by the power of its spring. When a blank as 7' from which a helical toothed gear is to be made is mounted on the table 6, the carriage 37 is operated and the spindle 38 is turned to cause the mill 47 to cut down into the blank or, if necessary, the mill can cut up into the blank from the under side thereof. I form several of these notches, for example four, and insure their proper spacing by the hand or power indexing mechanism shown in Fig. 10. When four of these notches are cut the index device 32 can be used and the blank 7' is turned step by step until the number of notches corresponds with that of the spaces in the helical toothed gear to be formed. These notches in the blank form in themselves index marks to insure the proper positioning of the tool 47 in making the finished blank. The tool will be entered into a desired notch or shallow cut, and the carriage or head 37 will be lowered, the motion of the carriage continuing until the tool passes below the blank. During the downward motion of the head or carriage or, if necessary, the upward motion of these parts, the blank is turned so as to obtain the tooth space of the desired shape, as will hereinafter more particularly appear. During the reverse movement of the turn-table 6 or while the final operations are being performed upon the blank which is to make the chevron gear, the index device 32 is not in action, and this result can be accomplished by holding the said index device in its backward position by the set-screw 32ª.

On the rear side of the carriage or head 37 are shown as fastened two elongated vertically disposed racks 56 and 57 meshing with gears 58 and 59 respectively. The gear 58 meshes with the pinion 60 meshing in turn with a gear 61. The gear 59 meshes with a gear 62. The arbors of the several gears 58, 60, 61, and 59 and 62, respectively, are removably fitted in elongated slots formed in the supporting plates 63, said arbors being held firmly in position by nuts designated in each case by 64. By removing any one of the nuts 64 a gear associated therewith can be dismounted.

Figures 4, 5, 12, 13:
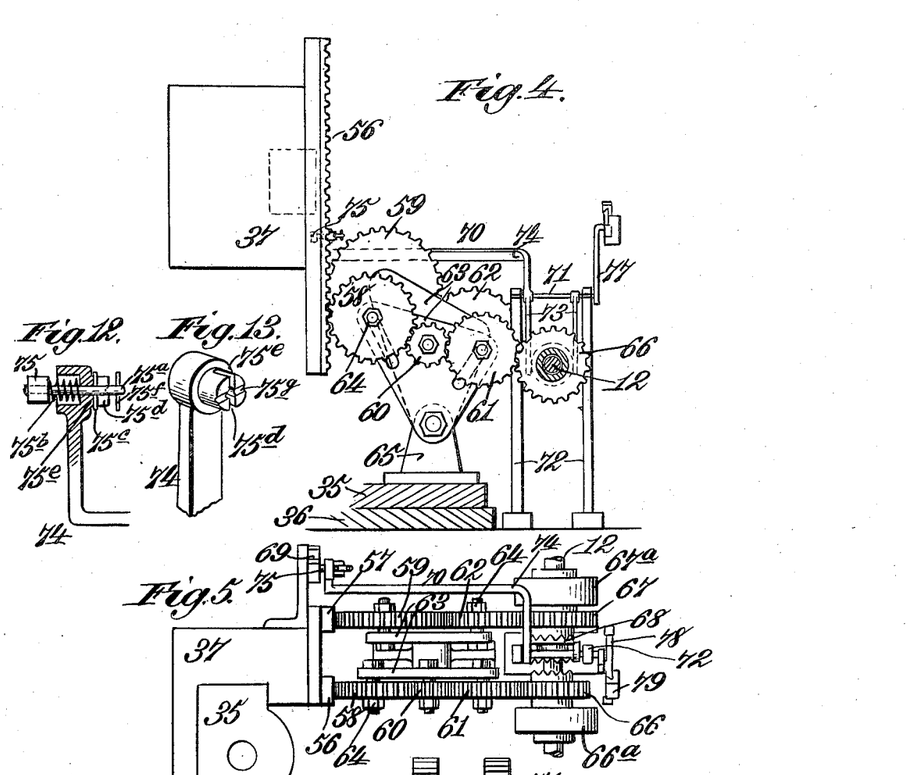
Figure 6:
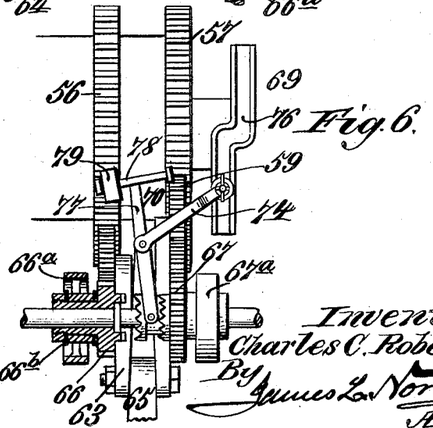
Fig. 6 is an elevation of said reversing mechanism.
Figure 7:
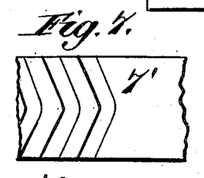
Fig. 7 is a detail edge view of a portion of a gear cut when the mechanism shown in Figs. 4 to 6, inclusive, is in action.

In cutting a straight-tooth or spur gear the two trains of gears just described are not in operation, and this result can be accomplished by dismounting one gear of each of said two trains, or the plates 63 can be dismounted, said plates being removably supported by a bracket as 65 sustained by the base portion of the standard 35, as indicated in Fig. 4. I will hereinafter describe another way of preventing the operation of the shaft 12 from the carriage or head 37 during the formation of the spur gear. The gear 61 is represented as meshing with a gear 66 loose on the shaft 12, while the gear 62 is shown as meshing with a gear 67 also loose on said shaft 12. The two gears 66 and 67, however, are adapted to be alternately clutched to said shaft 12, and a clutch member 68 may be utilized for this purpose, the clutch member 68 being shown in driving relation with the gear 67 in Fig. 6. The said clutch member is adapted to effect reversal in motion of the shaft 12. It will be assumed that the clutch member 68 as stated is in driving connection with the gear 67 and that the carriage or head 37 is being moved. The result is the rotation of the shaft 12 and thereby the turning of the gear blank centered by the arbor 5. It will be assumed that the carriage is still continuing its movement either down or up and that at a certain point in such movement the clutch member 68 is thrown into driving relation with the gear 66. When this action occurs the shaft 12 is reversed and the motion of the blank is also reversed. In Fig. 7 the blank 7' is shown as having several chevron teeth therein. The clutch member 68 is splined to the shaft 12 for sliding movement thereon and is adapted, as will be understood, to alternately coact with the gears 66 and 67. The movement of the clutch member 68 on said shaft 12 is effected in the present instance by a templet, former, or pattern which may be mounted in any suitable manner. Such a templet, former, or pattern is shown clearly in Fig. 6, being denoted in a general way by 69 and being attached to and movable with the carriage or head 37. A clutch shipping or shifting member such as that denoted in a general way by 70 and shown fully in Fig. 4 is coöperative with the former or templet 69. The clutch shipper 70 includes in its make-up a shaft as 71 supported for rocking motion by the standards 72, said shaft having attached thereto the depending arms 73 which, as in the case of ordinary shippers or shifters, are provided with pins or fingers to enter a peripheral or circumferential channel in the clutch member 68 so that, when the shaft 71 is rocked, the said clutch member can be moved in the direction of the axis of motion of the shaft 12 either into engagement with the gear 66 or 67 or into an intermediate position between said gears. The shaft 71 is further provided with an irregularly shaped or substantially-angular arm 74 suitably fastened thereto and terminating at its free or inner end in a projection as 75 which may, if desired, consist of an anti-friction roller adapted to traverse the channel 76 of the former or templet 69. The shaft 71 has further fastened thereto an upwardly extending arm 77 provided with a cross-head 78 on which is shown slidable a weight 79 adapted to move from one end of the cross-head 78 to the other. The weight 79 is shown in Fig. 6 as occupying one of its extreme shifted positions, at which time it is effective for holding the clutch member 68 positively in coöperative relation with the driven member or gear 67. When the clutch shipper 70 is thrown over and as soon as the arm 78 crosses a vertical line intersecting the axis of motion of the said shipper 70, the weight will slide to the opposite end of said cross-head 78 until it is arrested by its stop whereby said weight can hold the clutch member 68 in driving relation with the loosely mounted driven member or gear 66 which, it will be understood, is rotative in a direction opposite to that of the loosely mounted driven member or gear 67. The weight 79 therefore slides oppositely on the cross-head 78 and is effective when in its two positions for holding the clutch member 68 positively in driving relation with one or the other of the two gears 66 and 67. The shifting of the clutch member shipper or shifting device 70 is effected by the templet or former 76.

It will be assumed that a mill as 47 on the carriage or head 37 is being rotated, that a blank as 7' is clamped to the turn-table 6, that the carriage or head 37 is being moved downward, that the clutch member 68 is in engagement with the gear 67, and finally that the mill or tool 47 is in a previously formed shallow cut or notch in the upper side of the work or blank. As the carriage or head 37 moves downward the rack bars 56 and 57 operate the two trains of gears consisting respectively of the gears 58, 60, 61, and 59 and 62 to cause the rotation simultaneously of the two gears 66 and 67. The gear 66, however, although turned, rotates idly on the shaft 12 without accomplishing any result. Owing to the fact, however, that the gear 67 is clutched to said shaft, the latter is thereby caused to turn for turning the turn-table 6 so as to cause the mill or tool 47 to follow a diagonal path, this being for the purpose of producing the upper angular portion of the chevron tooth. During this time the projection or roll 75 is in the lower vertical portion of the channel 76. The downward motion of the carriage or head 37 will be continued until the tooth space is formed. When, however, the carriage or head has finished about half of its downward travel, the projection 75 will be caused to enter and then travel along the diagonal or oblique portion of the channel or groove 76; the walls of which acting as a cam, swing the arm 77 of the shipper 70 to the right in Fig. 6, the arms 73 of said shipper being swung to the left so as to cause the clutch member 68 to engage the gear 66, the weight 79 during the motion of the shipper 70 sliding along the cross-head 78. This motion of the shipper occurs just before the time the upper half of the angular or chevron space is cut. On the final downward movement of the head or carriage 37 the projection 75 rides up the upper vertical or guide portion of the channel 76, it being clear that at this time the clutch member 68 is in contact with the gear 66. In connection with the weight 79 it might be stated that the weight relieves the templet 69 of the complete operation of the shipper or shifting device 70 for, when the shifting device is at the center of the templet, the weight will throw said shifting device quickly into a shifted position. It might also be added that the weight is moved by hand to suit the direction in which the head 67 is traveling. The carriage or head 37 on its ascent may, if desired, cause, through the intermediate parts, the formation of a second tooth space and these spaces will be cut about the periphery of the blank 7' until the gear is finished. During the making of these angular cuts the index mechanisms are not in use, whereby the blank can be turned. During the completion of the blank to make a chevron gear, neither index mechanism is in use. Index mechanism, however, was used during the making of the initial cuts or notches in the blank prior to the completion of the said type of gear.

On the hubs of the gears 66 and 67 are loosely mounted pulleys as 66ª and 67ª, the pulley 66ª being driven by a cross-belt, while the pulley 67ª is driven by a straight belt during the formation of a helical gear. The effect of the two pulleys is transferred to the gears through the intervention of friction rings of leather or other suitable material, as 66ᵇ. The purpose of the parts just described is to prevent back lash in the several gears while the helical gear is being cut.

The projection or anti-friction roller 75 can be removed from the groove or channel 76 whereby the clutch member 68 can be moved to an intermediate position to effect the turning of the turntable, after one tooth space has been cut, a distance sufficient to bring the tool into register with a second notch for the formation of a second tooth space. The roller 75 is shown as rotatively supported by a pin as 75ª (see Fig. 12) sustained by the upper end of the angular arm 74. The roller is normally held in its advanced position by the power of a spring 75ᵇ, at which time the cross-key 75ᶜ fits in a slot 75ᵈ in the hub 75ᵉ through which the pin 75ª extends. The pin 75ª is provided with a handle 75ᶠ which can be grasped to pull the roller 75 out of the groove 76. When this is done the cross-key 75ᶜ will be out of the slot 75ᵈ so that the pin 75ª can be turned to move said key into a groove 75ᵍ in the said hub 75ᵉ. When the roller 75 is drawn back in the manner indicated the clutch shipper 70 can be moved to its neutral position to permit the turning of the blank 7' after the cutting of a tooth space therein, or to throw the chevron gear cutting mechanism entirely out of action, the latter occurring when it is desired to use the machine for cutting a spur gear.

I, of course, do not restrict myself to the precise mechanisms hereinbefore described, for I may make various modifications within the scope of my claims. It is not necessary, for example, to provide worm gearing to operate the turn-table 6, nor is it necessary even that a turn-table be utilized for supporting the work, stock, or blank. Other departures may be made from the disclosure hereinbefore given, within the scope of my invention.

What I claim is:

1. In a gear cutting machine, the combination of a turn-table for the gear blank, a cutter head reciprocable with respect to the turn-table, a motion transmitting shaft operatively connected to the turn-table for the gear blank, mechanisms connected to the cutter head mounted to be driven by said shaft and capable of turning the blank in reverse directions respectively, and means controllable by the movement of the cutter head for alternately setting said mechanisms into operation to turn the gear blank in reverse directions while the cutter head moves in a single direction.

2. In a gear cutting machine, the combination of a turn-table to support the gear blank, a motion transmitting shaft operatively connected to said turn-table, a reciprocatory cutter head, a pair of driven members mounted loosely on the said shaft and both connected to the cutter head so as to rotate the gear blank in reverse directions during the movement of the cutter head in one direction, and means for operatively connecting one of said driven members with the said shaft.

3. In a gear cutter, the combination of a rotatable support for the gear blank, a reciprocatory cutter head, a motion transmitting shaft operatively connected to the gear blank support, a pair of driven members loosely mounted on the said shaft, means for transferring the effect of said driven members to the blank for turning it, means movable with the cutter head while traveling in a single direction to turn said driven members in reverse directions, and means controllable by the cutter head for alternately setting the driven members into operation to turn the gear blank in reverse directions while the cutter head moves in one direction.

4. In a gear cutting machine, the combination of a rotary support for the gear blank, indexing mechanism therefor, a reciprocatory head carrying a cutter, a motion transmitting shaft operatively connected to the gear blank support, a pair of driven members loosely mounted on said shaft, racks connected to move with said head, intermediate gearing between said racks and driven members for revolving the latter in reverse directions during the movement of the head in one direction, and means for alternately connecting said driven members with the said shaft.

5. In a gear cutting machine, the combination of a rotary support for the gear blank, indexing mechanism for dividing the blank, a reciprocatory head carrying a cutter to operate on the blank, a shaft operatively connected to the gear blank support, a driven member loosely mounted on the said shaft, a rack carried by the said head, and intermediate gearing connecting the rack on said head to the driven member on the said shaft for reversing the direction of rotation of the gear blank support while the cutter head moves in one direction.

6. In a gear cutting machine, the combination of a rotary support for the gear blank, a reciprocatory head carrying a cutter to operate on the blank, a shaft operatively connected to the gear blank support, index means for dividing the blank, a pair of racks movable with said head, a pair of driven members loosely mounted on said shaft, change gearing interposed between the respective racks and driven members, the latter revoluble in reverse directions during the movement of said head in one direction for turning the gear blank support in two directions while the cutter head moves in a single direction, and a device operable automatically by said head for alternately setting the driven members into operation while said head moves in one direction.

7. In a gear cutting machine, the combination of means for supporting a blank, a power shaft for turning said blank, means for forming a tooth space in the blank, a reversing gear movement mounted on said shaft and means controlled by the movement of the tooth-forming means for actuating said reversing gear to turn said blank in opposite directions during the formation of said space.

8. In a gear cutting machine, the combination of means for supporting the blank, a power shaft, means operative by said power shaft for turning the blank, a reciprocatory carriage carrying a tooth-forming mill to operate on the blank, and means controllable directly by said carriage for imparting motion in reverse directions to said power shaft during the operation of said mill.

9. In a gear cutting machine, the combination of means for supporting the blank, a traveling head, a mill for acting on the blank, connected and movable with the head, and means controllable by said head for turning the blank in opposite directions during the motion of the mill in a single direction.

10. In a gear cutting machine, the combination of means for supporting the blank, a traveling head, a mill connected with said traveling head, to operate on the blank, and mechanism including a templet supported by the head, for controlling the turning of the blank in opposite directions during the operation of the mill.

11. In a gear cutting machine, the combination of means for rotatably supporting the blank, a tooth-forming tool adapted to operate on the blank, a reciprocatory head carrying said tool, forward and reverse gearing adapted to connect said head to the blank supporting means, and devices controllable by said traveling head for alternately setting into operation said forward and reverse gearing while said head moves in a single direction to form a tooth of irregular shape in the blank.

12. In a gear cutting machine, the combination of means for supporting the blank, a mill to operate on the blank, a traveling head, a power shaft, means operative by the power shaft for turning the blank, two driven members loosely carried by said shaft, a clutch on the shaft between said driven members, means for driving said driven members, and means directly coöperative with the head for alternately connecting said driven members with the shaft during the motion of said head.

13. In a gear cutting machine, the combination of means for supporting a blank, two driven members, means for transferring the effect of said driven members to the blank for turning the same, means for operating said driven members, a traveling head, means for turning said driven members in opposite directions, means coöperative with the head and adapted on the motion thereof in a single direction to alternately throw said driven members into operation, and a tooth-forming mill movable with said head.

14. In a gear cutting machine, the combination of means for supporting a blank, a mill to act on the blank for forming teeth therein, a traveling head with which said mill is movable, two driven members, mechanism coöperative with said head for turning said driven members in opposite directions on the motion of the head, a power transferring member to transfer the effect of said driven members to the blank for turning the same, and means directly coöperative with the traveling head and adapted on the motion thereof in a single direction to alternately throw said driven members into driving connection with said power-transferring member.

15. In a gear cutting machine, the combination of means for supporting the blank, a mill to operate on the blank, a traveling head with which said mill is movable, a shaft, means operative by the shaft for turning the blank, two driven members loosely supported by said shaft, means operative with the head on the motion thereof in a single direction for turning said driven members in opposite directions, a clutch between said driven members, a clutch shipping device, and means on the head for operating said clutch shipping device on the motion of said head to alternately put the clutch into operative connection with said driven members.

16. In a gear cutting machine, the combination of means for supporting a blank, a shaft, means operative by the shaft for turning the blank, a traveling head, a tooth-forming tool movable with said head, racks connected with the head, gears loosely carried by said shaft, trains of gearing for transferring the effect of said racks to the gears on said shaft and for turning said latter gears in opposite directions, a clutch member between the gears on said shaft, a clutch shipping device, and a templet on the head for operating the clutch shipping device to move said clutch member alternately into driving relation with the gears on said shaft, during the motion of said head.

17. In a machine of the class described, the combination of means for supporting the blank, a mill to operate on the blank, a traveling head with which said mill is movable, a shaft, means operative by the shaft for turning the blank, two driven members loosely supported by said shaft, means operative with the head on the motion thereof for turning said driven members in opposite directions, a clutch shipping device provided with a movable projection, a channeled templet on the head, the channel of which is adapted to receive said projection, and the latter being removable from the channel, and a clutch shiftable by said clutch shipping device alternately into driving relation with said driven members.

In testimony whereof I have hereunto set my hand in presence of two subscribing witnesses..

CHARLES C. ROBERTS.

Witnesses:
REUBEN H. TUCKER,
AUSTIN P. KIRKHAM.